(12) United States Patent  (10) Patent No.: US 9,065,925 B2
Ferguson  (45) Date of Patent: Jun. 23, 2015

(54) INTERRUPTIBLE, CONTEXTUALLY LINKED MESSAGING SYSTEM WITH AUDIBLE CONTRIBUTION INDICATORS

(76) Inventor: David Dwight Carter Ferguson, Kirkland, WA (US)

( * ) Notice: Subject to any disclaimer, the term of this patent is extended or adjusted under 35 U.S.C. 154(b) by 268 days.

(21) Appl. No.: 13/159,848

(22) Filed: Jun. 14, 2011

(65) Prior Publication Data

US 2012/0148034 A1 Jun. 14, 2012

Related U.S. Application Data

(60) Provisional application No. 61/386,223, filed on Sep. 24, 2010.

(51) Int. Cl.
*H04M 1/64* (2006.01)
*H04M 1/725* (2006.01)
*G06Q 10/10* (2012.01)
*H04M 3/533* (2006.01)

(52) U.S. Cl.
CPC ............ *H04M 1/7255* (2013.01); *H04M 3/533* (2013.01); *H04M 2250/60* (2013.01); *G06Q 10/107* (2013.01); *G06Q 10/109* (2013.01)

(58) Field of Classification Search
USPC ........... 379/88.14, 266.07, 266.1, 133, 88.26, 379/67.1, 88.04, 88.11, 93.23
See application file for complete search history.

(56) References Cited

U.S. PATENT DOCUMENTS

| | | | |
|---|---|---|---|
| 6,262,724 B1 * | 7/2001 | Crow et al. .................... | 715/723 |
| 2008/0162559 A1 * | 7/2008 | Bodin et al. ................ | 707/104.1 |
| 2011/0151890 A1 * | 6/2011 | Platt et al. ................... | 455/456.1 |
| 2011/0312315 A1 * | 12/2011 | Garcia ........................ | 455/422.1 |

* cited by examiner

*Primary Examiner* — Yosef K Laekemariam

(57) ABSTRACT

Systems and methods for providing a method of recording, delivering, reviewing and responding to messages such that the context of responses to the messages are recorded in the form of a message index to enable linking of messages and responses in a meaningful fashion for review by a user. The flow of conversation on a topic initiated in an original message is preserved in one or more conversation threads. Also incorporated is a method to indicate the party (user or entity) responsible for posting a response in the form of a brief audible icon overlaid on the original message and heard upon review, the icon also to be used to indicate affiliation with third parties at the option of the user or as a means to subsidize the cost of providing the messaging service.

18 Claims, 7 Drawing Sheets

INTERRUPTIBLE, CONTEXTUALLY LINKED MESSAGING SYSTEM WITH AUDIBLE CONTRIBUTION INDICATORS

CROSS-REFERENCE TO RELATED APPLICATIONS

This application claims the benefit of priority to U.S. Provisional Application No. 61/386,223, filed Sep. 24, 2010, which is incorporated herein by reference in its entirety.

BACKGROUND OF THE INVENTION

1. Field of the Invention

The present invention is directed generally to messaging systems, and more particularly, to interruptible, contextually linked messaging systems with audible contribution indicators.

2. Description of the Related Art

Since the common adoption of computers as messaging tools, the primary format of messages exchanged has been textual. Previous to this point automated voice messaging machines that were attached to the public telephone system were the most efficient means of message delivery short of direct conversation. The convenience of textual messaging, in the form of improved message management, was sufficient to drive adoption despite obvious drawbacks. Among the limitations of textual messaging is the loss of fidelity of the original message. The volume, inflection and rate of a voice message contain information not readily represented in textual form. Poorly composed textual messages can lead to ambiguity. Emotions and meaning may be incorrectly inferred from text whereas, in an audible message, those meanings are made clear by the additional dimensions of verbal communication.

Further, the act of translating a mental thought into a textual form, and the subsequent interpretation of that textual message by the recipient, adds several layers of complexity to the messaging process. Humans communicate most efficiently via speech, and any conversion of information away from speech decreases fidelity, convenience, and clarity.

Further, the physical act of composing a textual message by typing on a keypad (e.g., of a mobile phone or computer), as well as the act of reading the textual message on a display, necessarily distracts a user due to the textual message's requirement for physical interaction and visual inspection. This requirement can be problematic in scenarios such as driving or walking where those resources are already dedicated to important tasks.

There is currently a revolution in messaging as a result of high availability of handheld computers providing ubiquitous phone and data connections for the user. Messaging services built on these devices make it possible to receive and send messages at almost any time. Following the established trend, the majority of messaging systems use a textual format in the form of email, instant messaging, or text messaging.

BRIEF DESCRIPTION OF THE SEVERAL VIEWS OF THE DRAWING(S)

DETAILED DESCRIPTION OF THE INVENTION

Figure 1:
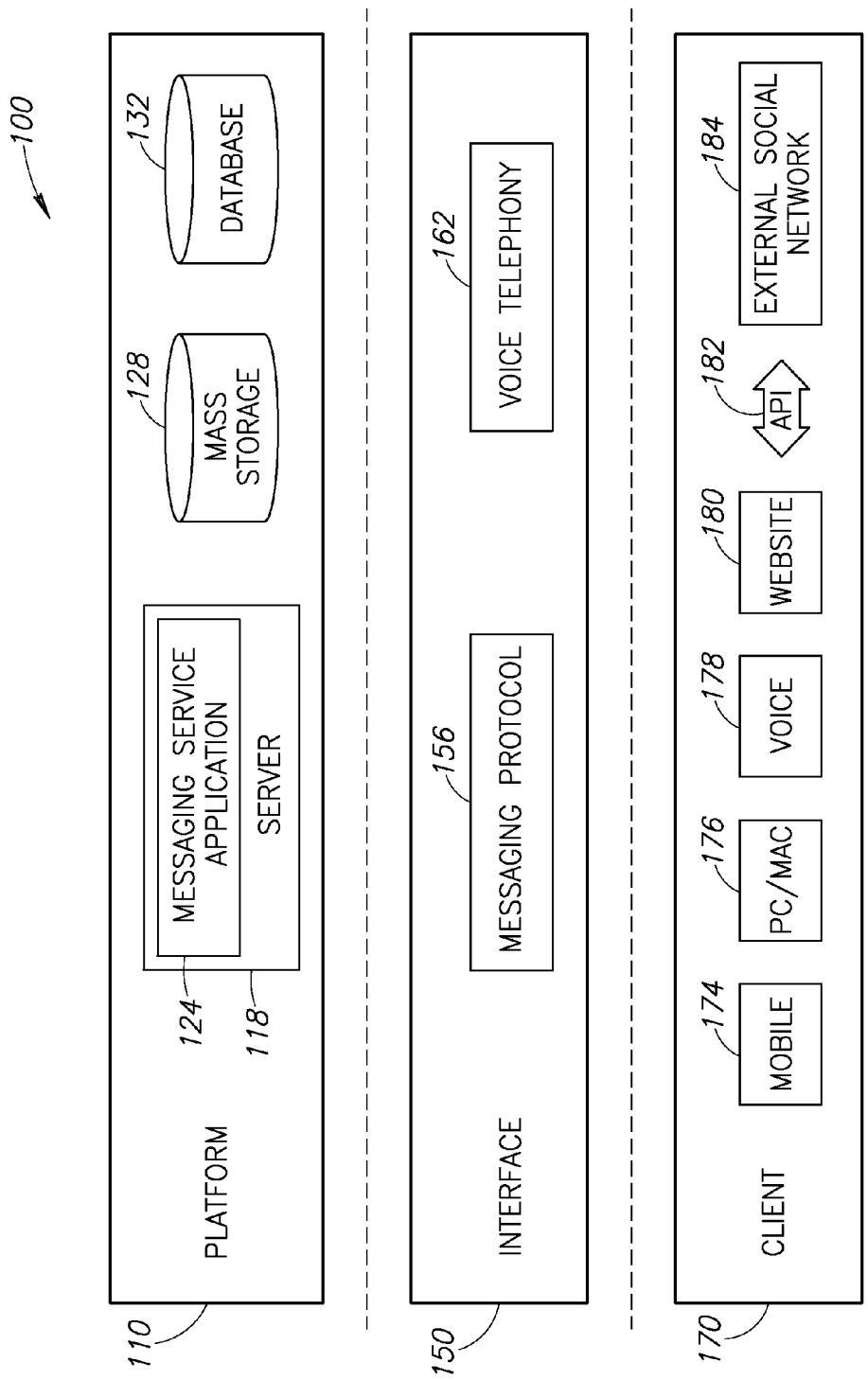
FIG. 1 is a block diagram of an architecture for a messaging system in accordance with an embodiment of the present invention.

Embodiments of the present invention relate to the exchange of messages between one or more parties or users over a network, such as the Internet. Specifically, the invention enables an efficient, natural means of composing, delivering, managing, reviewing, and responding to messages that offers benefits over contemporary messaging systems. Embodiments of the present invention include audio messaging systems that take audio messaging to a level beyond anything currently available. Using the features disclosed herein, messages can be routed to an individual or group. The messages can also be shared publicly. Advantageously, the messages can be contextually linked as responses to topics contained in other messages. Novel and innovative features regarding the linking and responding methods disclosed herein result in a new way of messaging that is more efficient and natural to use. Novel and innovative features regarding providing commercial advertising, representing user contribution, and funding services to subsidized accounts are also incorporated into embodiments of the present invention.

Embodiments of the present invention provide messaging services to subscribed users, giving them the ability to record, deliver, receive, review, and respond to messages primarily, but not necessarily, recorded in audio format. In some embodiments, messages may be recorded in other formats, including textual and/or video formats. The recorded messages are addressable to one or more subscribers to the messaging service, or delivered to non-subscribers by other means with a link back to the messaging service. The messages can be interrupted during playback in order to record responses which are then linked at the point of interruption, resulting in retention of conversational context for the responses. The contribution of a response to a message (e.g., by a different user) may be represented during future playback of the message as an audible icon ("audicon") representative of the user account that created the response message. Generally, an audicon is a brief audio clip used to represent participation of a user in a virtual conversation. When reviewing a message to which a user has responded, the responder's audicon may be played at one or more points at which they recorded a response to the message. There may be more than one response for which the same audicon is played.

User accounts can optionally be associated with commercial entities represented in the system by one or more brand accounts. Such accounts may generally be referred to as "sponsored accounts." This association results in a promotional brand audicon (or visual media) being inserted into messages generated by the sponsored user account resulting in a benefit to the commercial entity of exposure through impressions on users reviewing the messages. Payment to the messaging service provider by the entity benefited from the audicons may be used to offset the cost of providing the messaging service to the users. Similar association of entities with user accounts may be used to represent affiliation or support on the account of the user, thus personalizing the service and encouraging association with commercial entities, such as but not limited to, sports franchises, educational institutions, businesses, and the like. For example, a user may select their favorite football team to be associated with their user account, such that an audio or visual brand icon is played or displayed during playback of the user's messages. In some embodiments, the costs associated with a user account may be partially or fully subsidized by a sponsor (e.g., a corporate sponsor). As an example, in some embodiments user accounts are "free" for users and are associated with one or more sponsors. Users may select sponsors to be associated with their user accounts, or sponsors may be chosen for them. During playback of messages from a particular user, audicons or visual content promoting the user's associated sponsor or sponsors may be played or displayed on the device playing the messages. The sponsor's message may be played or displayed before playback of the user's message, after playback of the user's message, during playback of the user's message, or any combinations thereof.

FIG. 1 illustrates a block diagram for an architecture of a messaging system 100 in accordance with an embodiment of the present invention. The system 100 comprises a platform 110 including a server 118 operating a messaging service application 124. The server 118 and application 124 may be representative of one or more physical or logical servers and applications of the system 100. The platform 110 includes mass storage 128 for storing message data and a database 132 for storing meta-data, user information, transaction logs, and the like. In some embodiments, the mass storage 128 and/or the database 132 may be of the form of a cloud storage repository. The platform 110 is configured to communicate with remote clients 170 (or client applications) over the Internet via an interface 150 comprising a messaging protocol 156 and a voice telephony protocol 162. The remote clients 170 may include mobile device applications 174, PC/Mac applications 176, voice telephony applications 178, a website 180, and the like, executing on suitable devices. Requests from the remote clients 170 (applications 174, 176, and 178, and website 180) are accepted through web services, interpreted by the messaging service application 124, and the appropriate data is retrieved from the storage 128 and database 132 and sent to a client for presentation and/or manipulation.

As discussed above, access to the platform 110 is implemented on various platforms by client software or applications 174, 176, 178, and the system website 180 to make the system 100 universally accessible to users. Each platform may require its own implementation of client software (e.g., different programming languages and techniques). The various clients 174, 176, 178, and 180 are developed with the goal that the end user's experience varies as little as practicable between the platforms. Thus, for example, a user familiar with the client software on the website 180 would be able to easily install and use the client application 174 for mobile devices, such as a mobile phone. As can be appreciated, this cross-platform consistency provides an experience that is predicable and convenient for users.

The client applications 174, 176, 178, and 180 provide a means by which users can access and manipulate messages stored by the system 100. Exemplary user interfaces for the client applications are shown in FIGS. 5, 6, 7, and 8 and are described below. Each message may be linked to other messages within the system to form conversation threads. As discussed below, the client applications 174, 176, 178, and 180 present these messages and the resulting conversation threads to users in a way that makes it easy to listen to them and to create responses. The client applications 174, 176, 178, and 180 may also expose other messaging information to users through interaction with external social networks and messaging systems 184 (e.g., FACEBOOK®, LINKEDIN®, email systems, and the like) through an application programming interface (API) 182.

A diagram of hardware and an operating environment in conjunction with which implementations of the server 118, the client computing devices running the client applications 174, 176, 178, and 180, and the interface 150 may be practiced is provided in FIG. 9 and described below. In the description below, the phrase "computing devices" are meant to be construed as digital computing devices, including desktop personal computers (PCs), distributed computers, mainframes; further included in this category are portable or handheld/mobile computing devices, including laptop computers, tablet computers and cellular phones. All of these devices commonly employ hardware systems comprising a microprocessor, also known as a microcontroller unit (MCU) or central processing unit (CPU) and a digital memory for storing message media files and client application software, readable and executable by the MCU or CPU. All of the foregoing devices are understood to be capable of supporting a graphical user interface (GUI), and therefore further comprise a display screen, wherein the display screen may employ liquid crystal display (LCD) technology, light-emitting diode technology (LED) technology or cathode ray tube (CRT) technology. The following description of the invention may comprise any or all of the foregoing devices. The word "onboard" may be used in a phrase such as "onboard microprocessor" or "onboard memory" is meant to be construed as a hardware component contained within a computing device, such as the "microprocessor onboard the computing device operated by a first user".

Figure 2:
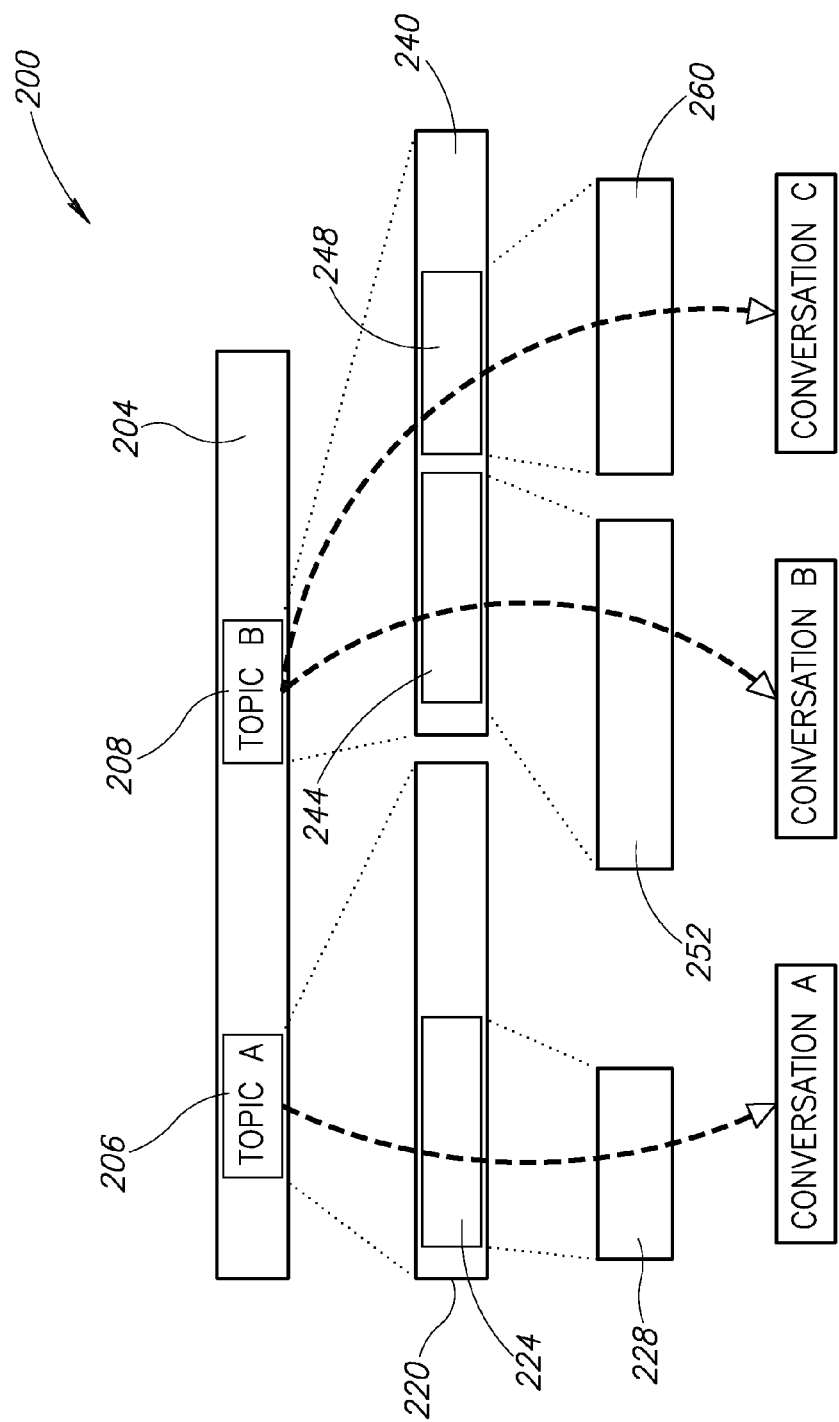
FIG. 2 illustrates various conversation threads created using the messaging system of FIG. 1.

FIG. 2 diagrammatically illustrates a compound message 200 comprising three conversation threads A, B, and C. The description below provides an example in the context of audio messages, but it should be appreciated that in some embodiments the messages may be in other forms, such as textual messages, video messages, other types of messages, or any combinations thereof. Originally, a first user may record an initial, or primary message 204 that includes a first topic 206 (Topic A) and a second topic 208 (Topic B). While listening to playback of the initial message 204, a second user may pause playback during the first topic 206 and record a first response message 220. The first response message 220 will be linked to the initial message 204 at the point in time where the playback was paused. By linking a response message to a parent message, it is meant that a metadata element is created by the client application containing a response message file insertion point, where the response message file insertion point corresponds to the portion of the primary message file length played back when paused by a user to record a response message file. By length, it is meant the total playback length of the message. This may be construed as time value, such as the total playback time of the message during playback, or may construed to mean the length of a message data file in bytes or words, where the file contains data representing the message, such as sound data for driving a sound card. The response message file insertion point may be represented by a time index, whereby the time index corresponds to the playback time of the parent message when the message is paused by a user for recording a subsequent response message file. The time index is the portion of the total playback time of a parent message file, when the parent message file was paused for recording a subsequent response message file. The time index may be equal to or less than the total playback time of the parent message. The time index may be measured, for instance, by a timing function implemented in hardware or software associated with an onboard CPU, and stored as one or more metadata elements representing time data. The response message file insertion point may also be a data offset address of the parent message read by the onboard microprocessor at the point where the user paused the playback of the parent message for recording a subsequent response message. The metadata created by the client application may include creation of at least one data identifiers for associating the response message insertion point metadata between a parent message file and a subsequent response message file. Further, the first user or another user may record a second response message 228 to the first response message 220 at a particular time point 224 of the first response message 220 to create a conversation thread A. Similarly, a user may pause playback of the initial message 204 at the second topic 208 and record a third response message 240. The first user or other users may also record fourth and fifth response messages 252 and 260 at points 244 and 248, respectively, of the third response message 240, to create conversation threads B and C, respectively.

By allowing users to pause playback and record response messages for an individual topic, the context and intention of each topic in the original message may be preserved, making the replies more impactful. As described above and shown in FIG. 2, in addition to responding to the initial message 204, the response messages (e.g., response message 220 and 240) may be responded to as well. Thus, the conversation threads A, B, and C are created from the initial message 204 and may be reviewed without distraction of replies to other topics or conversations in the original message 204. The resulting division of the initial message 204 into individual topics (e.g., topics 206 and 208) prevents the topics from being overlooked or forgotten as might have otherwise occurred. Thus, a user is able to listen to each of the conversation threads A, B, and C from beginning to end, mimicking natural communication patterns.

Figure 3:
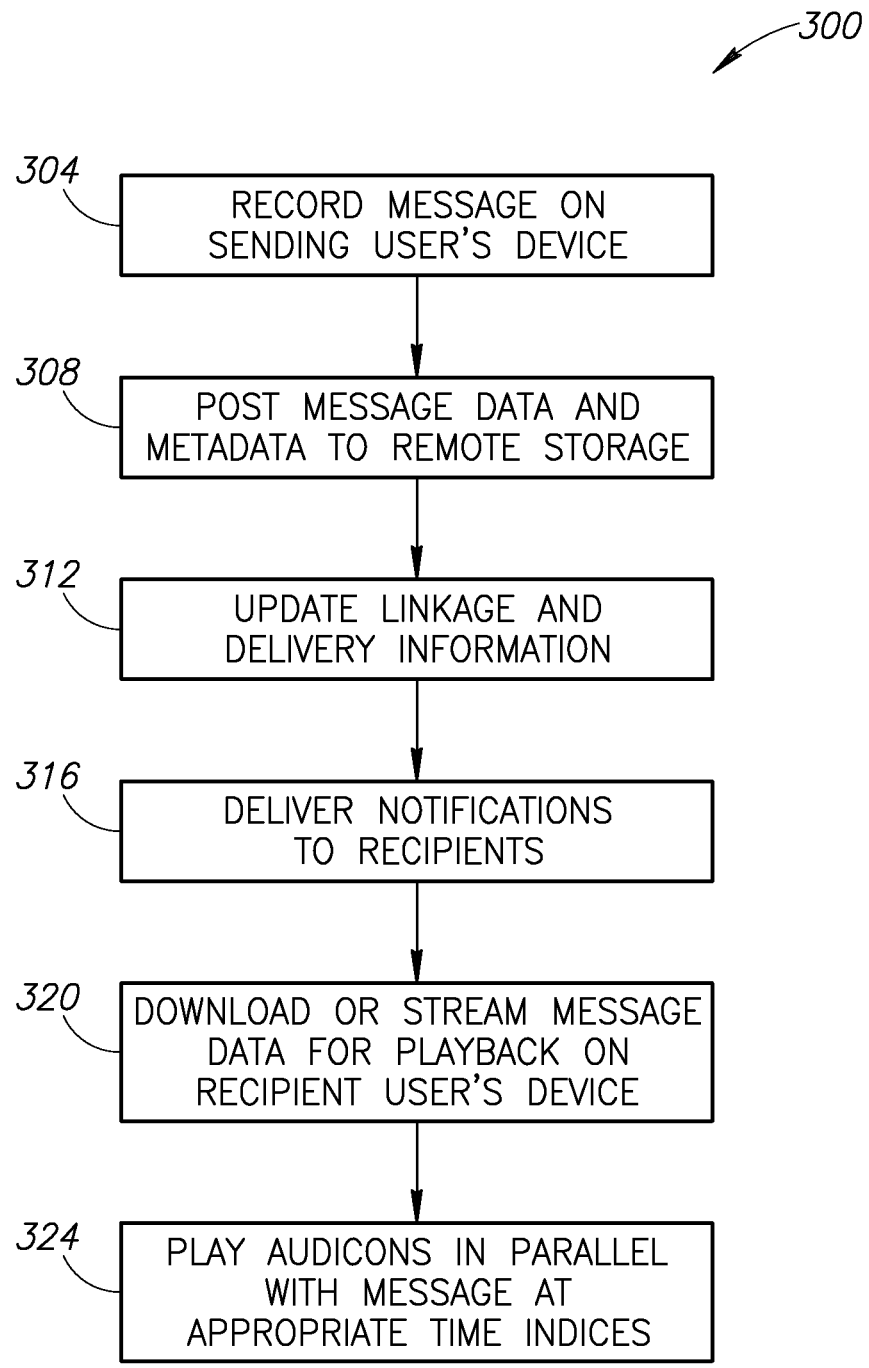
FIG. 3 is a flow chart for a messaging process using the messaging system of FIG. 1.

FIG. 3 illustrates an exemplary messaging process 300 that may be implemented using the messaging system 100 of FIG. 1. Initially, using a client application, such as the client applications 174, 176, 178, and 180 of FIG. 1, a message may be recorded on a sending user's device, step 304. Messages may be recorded either in response to previous messages or as new messages.

Recording is initiated at the user's discretion through the user interface on a user's device, such as a mobile phone, computer, or the like (see FIGS. 5-8). Message data may be recorded in any suitable format on the user's device, for example as text or in audio format such as .wav or .mp3 media files.

When the user indicates a recording is complete and has reviewed the message for accuracy, the message is delivered to the storage 128, (or a cloud-based repository, or the like) via standard Internet protocols including HTTP, HTTPS, or other protocols as might be developed and applicable in the future, step 308. In addition to the message content, a set of metadata may be delivered including additional information about the message such as recipient accounts, permissions, visibility preferences, message linking, and the like. In some embodiments, all or part of the message may be directly sent to and stored on the remote storage (e.g., without first storing the entire message locally on the user's device). Message linking may be facilitated by metadata elements including response message insertion points, as well as file data identifiers, associating a response message file with a parent message file.

The messaging service application 124 running on the server 118 of the platform 110 accepts delivery of the message content and metadata from the client application through the interface 150. The content may be stored in a storage repository (e.g., the storage 128 of FIG. 1) and is assigned a unique identifier within the system 100 by which it can later be addressed. The metadata may be parsed to extract relevant information. The system may then update linkage and delivery information for the message, step 312. The user account of the user sending the message may also be updated to reflect the new message posting. The posting account may be associated with the message for later retrieval of information, such as the user or sponsor account's audicon. Recipient user accounts indicated in the metadata of a message may be updated to reflect that a new message is available for the addressed recipient. Permissions are associated with the message in a database of permission information. Similarly, visibility or scope for the message is stored. If the message was a response to an existing message, a message index (e.g., a time index) of the point in time at which the new message should be linked to the existing message is stored in a database of links for later reference. In the case of textual messages, the message index may reference a particular location in the textual message (e.g., a word, a paragraph, or the like).

Notification of the availability of the new message is then sent to the addressed recipient or recipients, step 316. This notification can be manifested in many ways depending on how the client software is implemented. For example, a user may get an alert on a device running a client application. As can be appreciated, the alert may be audible and/or visual. The specific implementation is not critical, but should be sufficient to alert the user in an unobtrusive but obvious way that a message has been delivered to the user's account.

When the user requests to review a message, the data storage 128 and database 132 are queried for the message content and metadata. In some embodiments, the content and metadata are delivered via standard Internet protocols such as HTTP or HTTPS and are parsed by the recipient user's device, step 320. The client software or application operating on the recipient user's device renders the message content in whichever form is appropriate, such as playing an audible message or displaying text. The content may be downloaded and subsequently played on the recipient user's device or may be streamed on the user's device.

Links to other messages as represented in the downloaded metadata may also be included on a user interface when the recipient user reviews messages (see FIG. 6), possibly as audible icons during playback or as visible icons displayed in a textual or graphical context, step 324. Other metadata may also be thus represented, such as the audicon of a sponsor account. Because it is undesirable for a user to be distracted while reviewing a message, the audicons or other representations should not interfere unduly with the message data itself. For example, an audicon may be laid over an audio message but its volume may be such that the original message content is still audible and can be easily understood.

Figure 4:
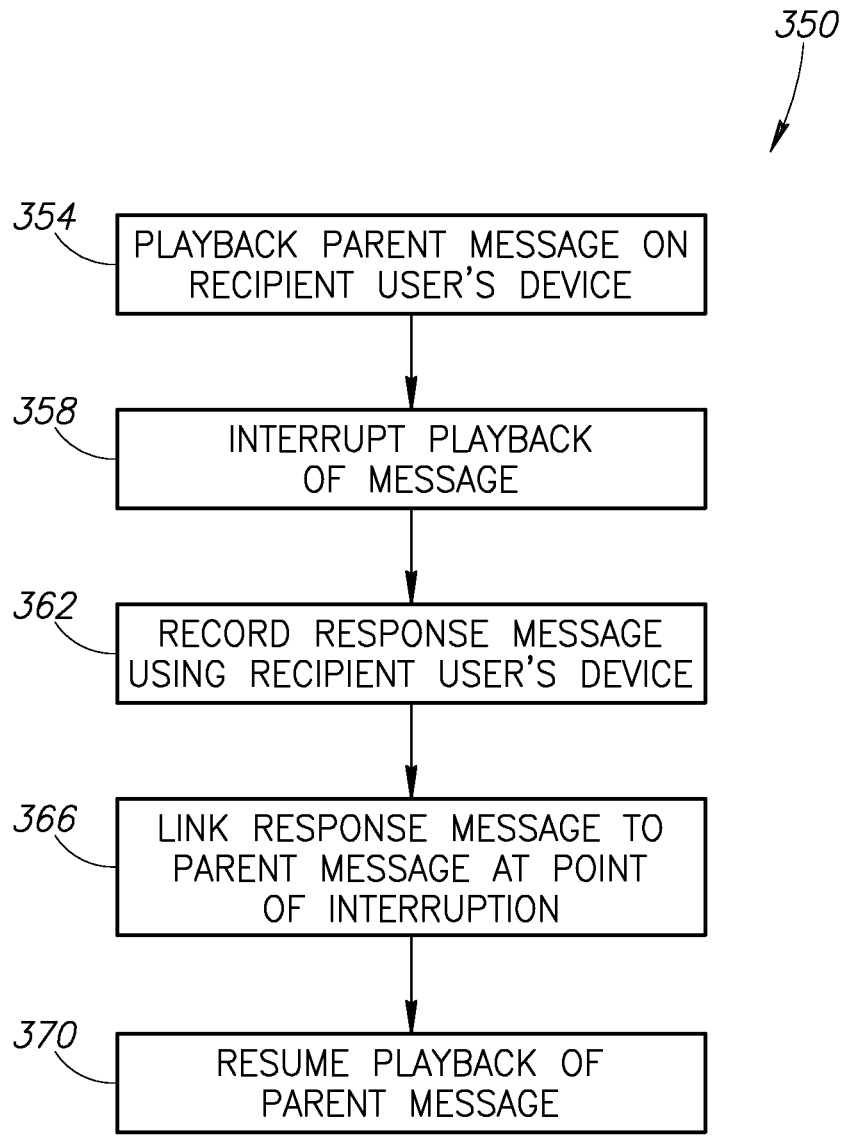
FIG. 4 is a flow chart for another messaging process using the messaging system of FIG. 1.

FIG. 4 illustrates a messaging process 350 for using the messaging system 100 of FIG. 1. At step 354, a recipient user may initiate playback of a received message on a device running a client application. The user interface of the client application provides a means, such as a soft button shown on the display screen of the device, for the user to interrupt or pause playback or review of a message such that a response can be recorded at the current location or time index of the message playback, steps 358 and 362. In some instances, the user may wish to record a response message at the end of the message being played back, rather than at some point during the message before its end. In these instances, the location in the message media file, or time index, will correspond to the end of the message being played back, and the point of interruption corresponds with the end of the message. The response message is then linked to the original message at that time index, step 366. Specific information regarding this linking, such as the time index or location by creating the response message insertion point and identifier metadata elements as described above, by the client application on the recipient device, may be stored as metadata (e.g., in the database 132 or storage 128) for the message for future reference. Once the response message has been recorded and linked, the user's device may resume playback of the original or parent message, step 370.

As discussed above, the system 100 may be accessed via a user-operated digital computing device, such as a computer, a mobile phone, a conventional telephone, or the like. Messages addressed to a user's account will be available for the user to review. Because messages are stored in a repository on the Internet (e.g., the storage 128, a cloud storage, etc.), they are accessible by any device which has access to the Internet. As discussed above, in some embodiments, a voice-command interface and/or application is also available to permit users to access the system 100 via a conventional telephone.

Figure 5:
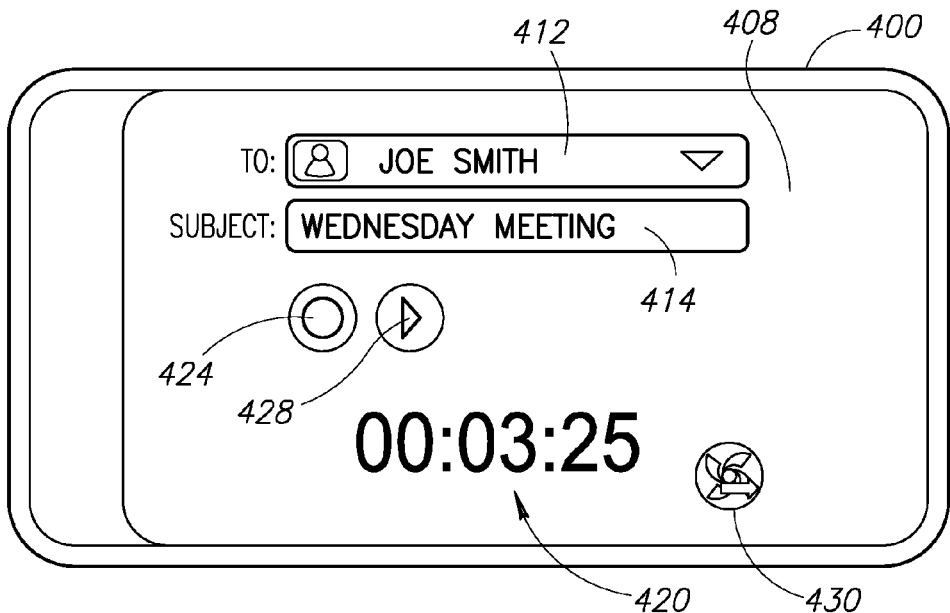
FIG. 5 illustrates a user interface of the messaging system of FIG. 1 that allows a user to record a message to be sent to one or more recipients.

FIG. 5 illustrates an exemplary user interface 408 for a client application running on a digital computing device 400, such as a mobile phone. The user interface 408 is operative to allow a user to record and send a message using the system 100 described above. The interface 408 includes a "To:" field 412 and a "Subject:" field 414 that allow a user to select one or more recipients and to provide a subject line for the message. The interface 408 also includes a record button 424 and a playback button 428 that allow a user to record a message and to play it back, respectively. The user interface 408 also includes a time display 420 that shows the user the length of the recorded message in the "hh:mm:ss" format. Once a user has recorded and reviewed a message, the user interface 408 may allow the user to send the message to the recipient or recipients identified in the "To:" field 412 by clicking on a send button 430.

Figure 6:
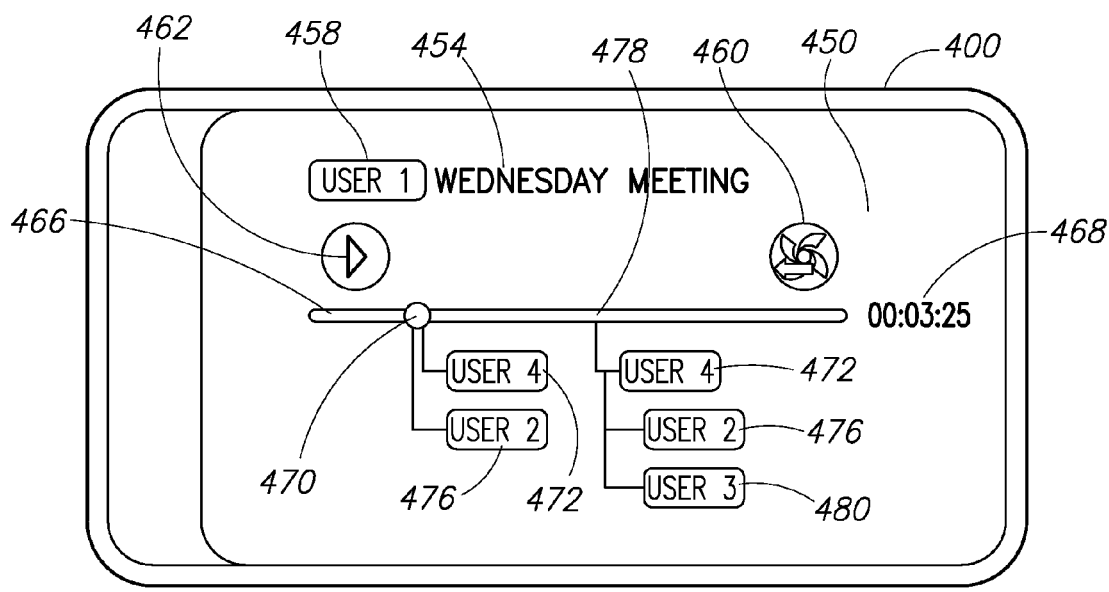
FIG. 6 illustrates a user interface of the messaging system of FIG. 1 that allows a user to review a recorded message.

FIG. 6 illustrates another user interface 450 for the digital computing device 400 shown in FIG. 5, such as would be used by a recipient of a message. The user interface 450 is operative to allow a user to review a message by clicking on a play button or icon 462, to review response messages, and to record response messages by clicking on a button or icon 460. The user interface 450 shows a timeline 466 for a parent message, an icon 458 for a first user (or simply user 458) indicating the sending user of the parent message, and a subject line 454 for the parent message. The timeline is a linear graphical representation of a the length in data bytes of a message media file. The first terminus of the linear graphical representation of the file length, as shown as the right terminus of the message timeline in FIG. 6, corresponds to the beginning of the message file. The second terminus corresponds to the end of the message file. A plurality of user icons 476, 480, and 472 representing a second user, a third user, and a fourth user, respectively, are positioned along the timeline 466 of the parent message. The graphic used for each of the user icons 472, 476, and 480 may be unique to the user posting the message, which makes it easy for users to see who has replied to the parent message, and at what point they have replied. In some embodiments, each of the user icons 472, 476, 480 may include a photo of its corresponding user.

As shown in FIG. 6, users 472 and 476 (represented by icons 472 and 476, respectively) have both recorded a response message to the parent message at time index 470 on the timeline 466. Further, the user 472 has recorded a response message at time index 478. As shown, the user interface 450 also indicates that the users 476 and 480 have recorded response messages to the response message by user 472 at time index 478, creating a conversation thread as described above. The user can easily listen to any reply by clicking on its graphical icon.

When a user clicks on a message icon (e.g., icons 458, 472, 476, and 480), the client application may adjust the display of the user interface 450 to display a new timeline for the selected message, including any subsequent replies associated with it. Thus, the user is able to manually "walk down" a conversation thread sequentially listening to each message of the thread. The application may also provide an automated filter that is operative to play a particular conversation thread from beginning to end without user intervention. Thus, to form conversation threads, linked messages may be chained, either by the messaging service application or the client application, whereby a subsequent response message file, recorded in response to previously recorded response message, is linked thereto by the process described above. The previously recorded response message is thus the parent message of the subsequent response message. The previously recorded response message may have been linked to a still earlier recorded response message or to the original primary message. The still earlier response message is then the parent message. A chain of messages is thus created, forming a conversation thread. One or more conversation threads may be linked to a primary message. In the example of a graphical message display in FIG. 6, each message may be represented by an icon, or other form a graphical prompt, where a series of linked messages may be represented by cluster of icons or graphical prompts. In the following description, "icon" and "message" are used interchangeably. This is shown in FIG. 6, an example of a configuration of the cluster of icons 472, 476 and 480. This icon cluster is linked to timeline 466 via a first response message 472. The point of linkage of first response message along timeline 466 corresponds to the response message insertion point where playback of the primary message was paused to record the first response message. The response file insertion point is a graphical distance along the timeline extending from the beginning (first terminus) of the primary message file, and corresponds to the time index or the count of data bytes read by the onboard microprocessor at the point during playback when the primary message file was paused for recording the response message file. Response message 472 is a parent message to subsequent response message 476. Response message 476 is in turn a parent message to subsequent response message 480. The icons representing these response messages may be arranged in a temporal hierarchy, as shown in FIG. 6. Icons 472, 476 and 480 are shown linked together, in a descending order corresponding to their temporal relationship, which is the order in which the subsequent response messages were recorded and linked. It will be appreciated by those skilled in the art that other representations are possible.

As discussed above, while reviewing a recorded message, the user will be alerted to responses that may have been previously recorded by other users. In addition to or instead of the icons shown in FIG. 6, the form of the alert may be a brief audible icon representative of the user account used to record the response. For example, a suitable audicon might be the playing of a user's name (e.g., "message from John") or a short sound associated with the user's account, similar to a ring tone. Should the user wish to listen to the response, the message can be paused and playback of the response may be initiated.

Figure 8:
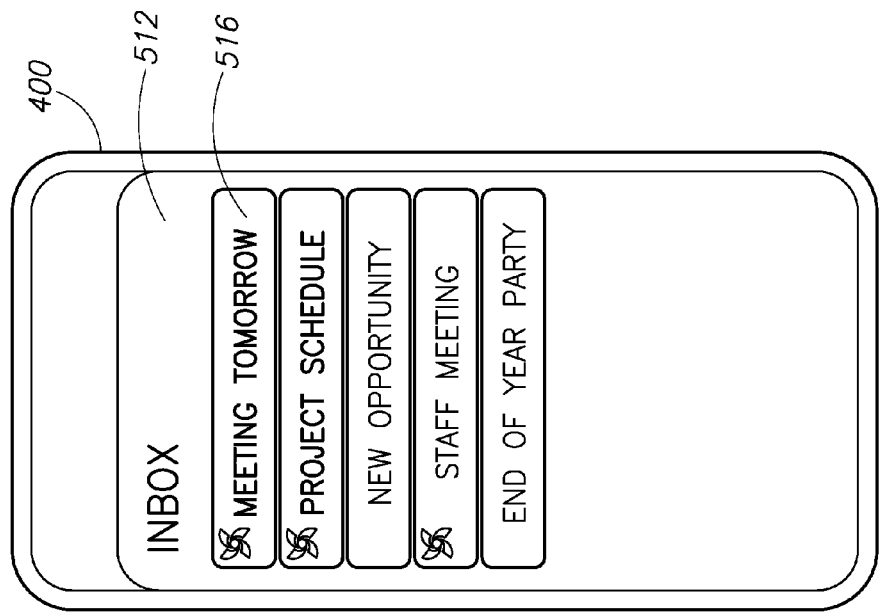
FIG. 8 illustrates a user interface of the messaging system of FIG. 1 that provides a user with an inbox of received messages.
Figure 7:
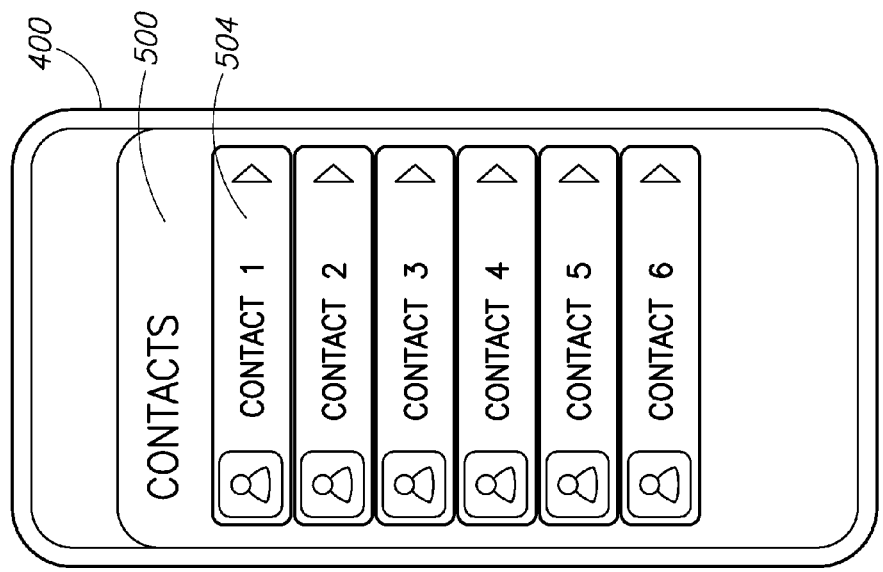
FIG. 7 illustrates a user interface of the messaging system of FIG. 1 that provides a contacts list for a user.

A user wishing to record a message can specify the desired recipient or recipients from a contacts list or by providing a recipient's user account name or other identifying information. FIG. 7 illustrates an exemplary user interface 500 that includes a list of contacts 504 for a user. As shown in FIG. 8, client applications may also include a user interface 512 that is operative to display an inbox 516 of messages received by a user. As can be appreciated, the user interface 512 may also provide an outbox, sent items box, other folders, and the like.

The system 100 may include other features as well. For example, the system 100 may be operative to provide pertinent statistics about a given conversation thread, such as the number of contributors, thread depth (i.e., the number of responses chained together to reach a given point), thread length (in time), contributions for a particular user and the average length of their responses, and the like. This information may be useful in determining the efficiency or effectiveness of a conversation thread or its contributors.

Information pertinent to a given message but existing in a different form (e.g. images, URLs, video clips, documents, and the like) may be linked to the message such that the information is delivered in tandem and is available for review by the recipients of the message. The user interfaces of the client applications may display one or more visual indicators to represent the existence of the linked information (or "linked media"). The indicators act as shortcuts which the user can select to initiate review of the linked media.

In some embodiments, to enable hands free or audible use, the client applications support voice command and control. Voice commands may be used to review existing messages, initiate recording of replies, and otherwise navigate the messaging system 100. Replies to a message may be represented during playback by audicons which uniquely represent the user posting the reply. Thus, a user listening to a message is aware of who is replying at a particular point within the message, even if the visual interface is inaccessible, such as while driving. Through a voice command and control interface, the user can choose to pause playback and listen to a reply immediately if desired. Should a user be unable to respond with a spoken reply, the client application may also accept a typed message which is automatically converted to audio via a text-to-speech service of the system 100. Similarly, the user may request that the system 100 transcribe an audio message to text for review. This feature expands the set of scenarios in which the messaging system 100 can be used.

Figure 9:
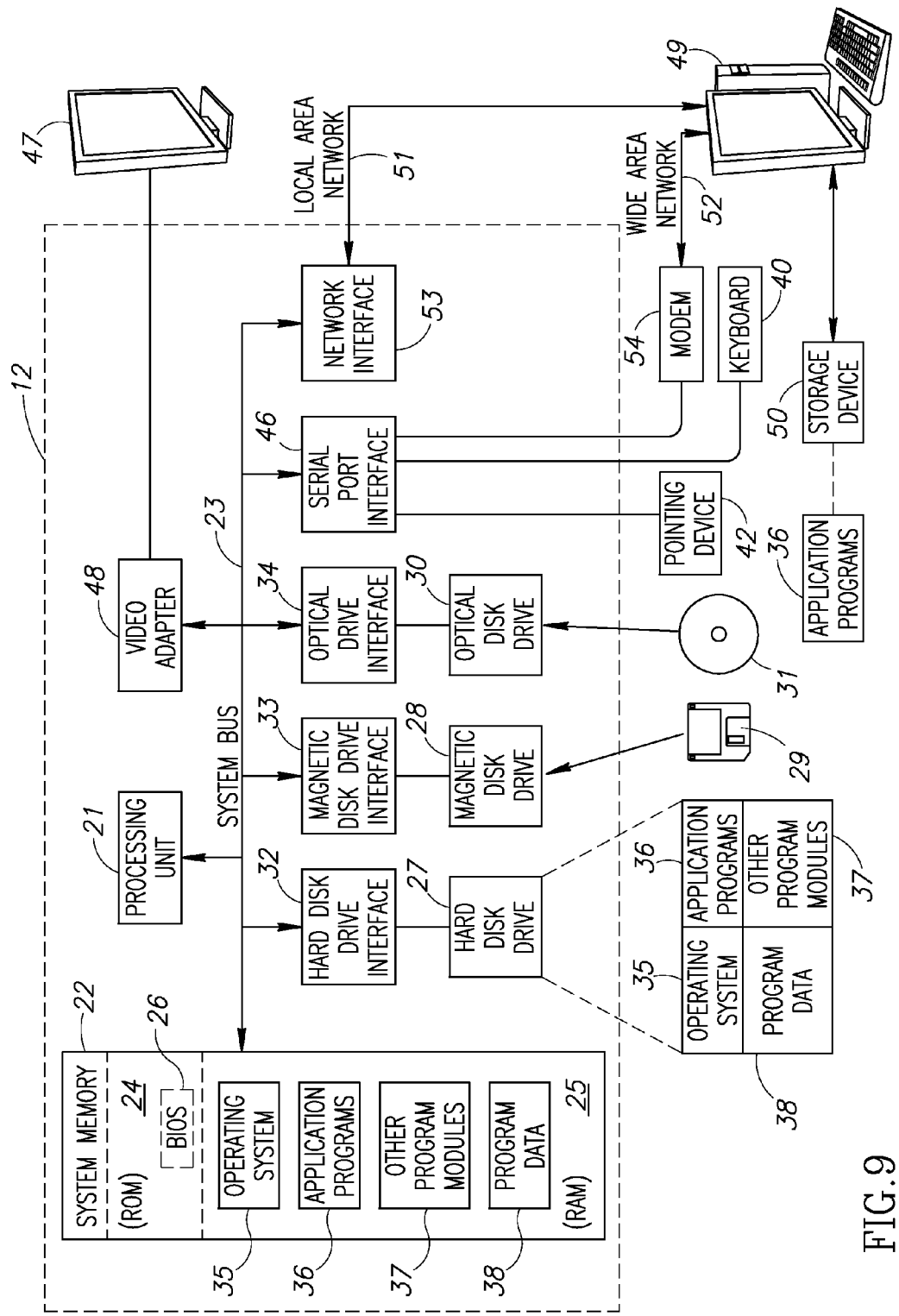
FIG. 9 is a diagram of a hardware environment and an operating environment in which one or more of the computing devices of the messaging system may be implemented.

FIG. 9 is a diagram of hardware and an operating environment in conjunction with which implementations of the messaging system 100 may be practiced. The description of FIG. 9 is intended to provide a brief, general description of suitable computer hardware and a suitable computing environment in which implementations may be practiced. Although not required, implementations are described in the general context of computer-executable instructions, such as program modules, being executed by a computer, such as a personal computer or the like. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multiprocessor systems, microprocessor-based or programmable consumer electronics, network PCs, minicomputers, mainframe computers, and the like. Implementations may also be practiced in distributed computing environments where tasks are performed by remote processing devices that are linked through one or more communications networks. In a distributed computing environment, program modules may be located in both local and remote memory storage devices.

The exemplary hardware and operating environment of FIG. 9 includes a general-purpose computing device in the form of a computing device 12. Each of the applications (e.g., the messaging service application 124, the client applications 174, 176, 178, and 180, and the like) may be implemented using one or more computing devices similar the computing device 12.

The computing device 12 includes the system memory 22, a processing unit 21, and a system bus 23 that operatively couples various system components, including the system memory 22, to the processing unit 21. There may be only one or there may be more than one processing unit 21, such that the processor of computing device 12 comprises a single central-processing unit (CPU), or a plurality of processing units, commonly referred to as a parallel processing environment. The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and may include read only memory (ROM) 24 and random access memory (RAM) 25. A basic input/output system (BIOS) 26, containing the basic routines that help to transfer information between elements within the computing device 12, such as during start-up, may be stored in ROM 24. The computing device 12 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media. The computing device 12 may also include one or more other types of memory devices (e.g., flash memory storage devices, and the like).

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those skilled in the art that any type of computer-readable media which can store data that is accessible by a computer, such as magnetic cassettes, flash memory cards, USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, USB drives, and the like) accessible by the processing unit 21 may be considered components of the system memory 22.

A number of program modules may be stored on the hard disk drive 27, magnetic disk 29, optical disk 31, ROM 24, or RAM 25, including an operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a parallel port, game port, a universal serial bus (USB), or the like. A monitor 47 or other type of display device is also connected to the system bus 23 via an interface, such as a video adapter 48. In addition to the monitor, computers typically include other peripheral output devices (not shown), such as speakers and printers.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 9 include a local-area network (LAN) 51 and a wide-area network (WAN) 52. Such networking environments are commonplace in offices, enterprise-wide computer networks, intranets and the Internet.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A messaging system, comprising:
   (i) a server;
   (ii) a messaging service application stored on said server, said messaging service application operative to control the storage and transmission of message data between a plurality of users over a digital network;
   (iii) a mass storage device for storing said message data;
   (iv) a database for storing metadata linked to said message data;
   (v) a user communication network comprising two or more users;
   (vi) at least two digital computing devices having a microprocessor and adapted for digital voice and data communication over the digital network, each user of the user communication network operating one of the digital computing devices of the at least two digital computing devices, the at least two digital computing devices having graphical display screens; and
   (vii) a client application stored in the onboard memory of each of the at least two digital computing devices, the client application having a user interface displayed on the graphical display screens of the digital computing devices, the client application being adapted to permit a first user of the user network to digitally record a primary message file on the first user's digital computing device and to relay the digital content of the primary message over the digital network to the digital computing devices operated by the two or more users within the user network via the messaging service application, the client application further adapted to permit each recipient user of the user network to playback the content of the primary message file users' digital computing devices, and to permit at least one recipient user within the user network to pause the playback of the primary message file for recording at least one response message file linked to the primary message file, wherein the client application creates a data structure comprising at least one metadata element storing a response message insertion point, the response message insertion point corresponding to the portion of the length of the primary message file played back when said primary message file was paused during playback by said at least one recipient user for recording the at least one response message file, and at least one identifier metadata element storing data for linking the response message insertion point to the corresponding at least one response message file and to the primary message file.

2. The messaging system of claim 1, wherein the client application is further adapted to evoke one or more prompts during playback of the primary message file relayed by the first user of the user network to the one or more recipient users within the user network via the messaging service application, each of the one or more prompts being presented at the specific response message insertion point linked to the primary message file each response message insertion point stored in one or more metadata elements created by the client application.

3. A method for providing a messaging system, comprising:
  (i) providing a digital network including a server and a messaging service application stored on said server;
  (ii) providing two or more digital computing devices adapted for voice and data communication over the digital network, each digital computing device storing a client application adapted to;
  (iii) providing a user network having two or more users, each user operating one of the two or more digital computing devices being adapted for voice and data communication over the digital network;
  (iv) receiving, by the messaging service application, a primary message recorded on a first digital computing device of a first user of the user network and sent over the digital network by the client application onboard the first digital computing device;
  (v) delivering, by the messaging service application, the primary message over the digital network to at least one of the client applications stored on the one or more digital computing devices operated by the two or more users of the user network, the messaging service application delivering the primary message over the digital network;
  (vi) receiving over the digital network by the messaging service application, at least one response message file responding to the content of the primary message file, the at least one response message file being recorded on at least one of the one or more digital computing devices operated by at least one of the two or more users within the user network, and sent over the digital network to the messaging service application by at least one of the client applications stored onboard the one or more digital computing devices;
  (vii) reviewing the content of the primary message file by the at least one user within the user network, the content of the primary message file being played back through the user interface on the computing device operated by the at least one user by the client application;
  (viii) creating one or more response message files relating to the content of the primary message media file being played back on the digital computing device operated by the at least one user within the user network, wherein the at least one user commands the client application via the user interface to pause playback of the primary message file one or more times during playback of the primary message file and record and store a response message file at each of the one or more pause events, each of the one or more pause events occurring at specific intervals of the primary message file length;
  (ix) linking the one or more response message media files to the content of the first message media file, wherein the client application stored on the digital computing device operated by the at least one user within the user network is adapted to create a data structure comprising one or more response file insertion point metadata elements and one or more data identifier elements, each response file insertion point metadata element storing data corresponding to the interval of the primary message file length played back when said primary message file was paused during playback by said at least one recipient user for recording a response message media file, and at least one data identifier metadata element storing data for linking the response message insertion point to the corresponding first response message file and to the primary message file;
  (x) delivering to the messaging service application by the one or more client applications over the digital network—the one or more response message media files linked to the primary message media file and their associated metadata;
  (xi) updating, by the messaging service application, the metadata associated with the primary message file with the one or more response message insertion points and identifier metadata elements storing data for linking the response message insertion point to the corresponding first response message file and to the primary message file; and
  (xii) delivering over the digital network to the one or more client applications stored on the computing devices operated by the two or more users within the user network the primary message file and the one or more response message files linked to said primary message file and the metadata associated with said primary message file and the one or more response message files linked to said primary message file.

4. The method of claim 3, further comprising:
  (i) reviewing, by at least one recipient user within the user network, the content of at least one of the one or more response media messages delivered to client application stored on the digital computing device operated by the at least one recipient user and played through the user interface;
  (ii) creating one or more subsequent response message files responding the content of any of the one or more of the first response message media files being played on the digital computing device operated by the at least one recipient user within the user network, wherein the at least one recipient user commands the client application via the user interface to pause playback of the first response message media file one or more times during playback and record and store a response message media file at each pause event;

(iii) linking the one or more subsequent response message media files to the content of the first response message media file, wherein the client application stored on the digital computing device operated by the at least one recipient user within the user network is adapted to create a data structure comprising one or more response file insertion point metadata elements and one or more data identifier elements, each response file insertion point metadata element storing data corresponding to the interval of the primary message file length played back when said primary message file was paused during playback by said at least one recipient user for recording a response message media file, and at least one data identifier metadata element storing data for linking the response message insertion point to the corresponding first response message file and to the primary message file;

(iv) storing the one or more subsequent response message media files linked to the first response message media file, and their associated metadata, delivered to the messaging service application by the one or more client applications over the digital network by the client application stored on the one or more digital computing devices operated by one or more recipient users within the user network;

(v) updating and storing, by the message service application, the metadata associated with the first response message media file with metadata elements identifying the one or more subsequent response message media files linked to said first response message media files; and (vi) delivering over the digital network to the one or more client applications stored on the computing devices operated by the one or more recipient users within the user network, the first response message media file and the subsequent response message media files linked to the first response message media file, and updated metadata associated with the first response message media file and the one or more subsequent response message media files.

5. The messaging system of claim 2, wherein the client application is further adapted to playback the content of the response message file linked to the primary message file when said client application is activated to playback the linked response message file by one or more of the users within the user network in response to the prompt.

6. The messaging system of claim 1, wherein the client application is further adapted to chain one or more subsequent response message files to the primary message file for creating conversation threads, wherein the client application is activated by the at least one recipient user within the user network to playback the content of the one or more previously recorded response files linked to the primary message file, and to record one or more subsequent response message files when said one or more previously recorded response message files are paused by the at least one recipient user for recording the one or more subsequent response message files, and wherein the client application creates one or more subsequent response message insertion point metadata elements associated with the one or more previously recorded response message files linked to the primary message file, storing data corresponding to the portion of the length of the one or more previously recorded response message files linked to the primary message file played back when said one or more previously recorded response message files linked to the primary message file were paused during playback by said at least one recipient user for recording one or more subsequent response message files, and wherein the client application creates at least one data identifier metadata element containing data for associating the response message insertion point between the one or more subsequent response message files and to the one or more previously recorded response message files linked to the primary message file.

7. The messaging system of claim 6, wherein the client application is further adapted to present a linear graphical representation of the primary message file length disposed on the user interface graphical display screens on the two or more digital computing devices, wherein a first terminus of the linear graphical representation corresponds to the beginning of the primary message file and a second terminus of the linear graphical representation corresponds to the end of the primary message file, and wherein each of the one or more response message files are represented by graphical prompts, and one or more conversation threads linked to the primary message file are graphically presented by one or more prompt clusters, each of the one or more prompt clusters comprising a group of one or more graphical prompts, each graphical prompt of the group of one or more graphical prompts arranged to graphically represent the temporal sequence hierarchy of the chained response message files, wherein the first graphical prompt represents the first response message file linked to the primary message file and the chained response message files of the thread are graphically represented by a hierarchical chain of graphical prompts arranged in a temporal sequence, the first graphical prompt of the one or more graphical prompts disposed along the length of the graphical linear representation of the primary message file length at a distance extending from the first terminus of the linear graphical representation, wherein said distance corresponds to the length portion of the primary message file played back when said primary message file was paused for recording the response message file, said distance being less than or equal to the length of the linear graphical representation of the primary message file, and wherein the response message files are played when the graphical prompts representing the response message files are activated.

8. The messaging system of claim 7, wherein the client application is further adapted to present on the graphical display screens disposed on the two or more digital computing devices a linear graphical representation of the length of any one of the one or more subsequent response message files invoked when the graphical prompt representing the one of the one or more response message files is activated.

9. The messaging system of claim 1, wherein the client application is further adapted to evoke one or more audible prompts during playback of the primary message file by the one or more recipient users within the user network via the messaging service application, the one or more audible prompts being evoked when the one or more response message insertion points stored in the one or more metadata elements associated with each of the one or more response message files are reached during the playback of the primary message file by the client application via the user interface.

10. The messaging system of claim 9, wherein the client application is further adapted to playback the content of the one or more response message file linked to the primary message file when said client application is activated by the one or more of the users within the user network in response to the audible prompt.

11. The messaging system of claim 1, wherein the client application is further adapted to chain one or more subsequent response message files to any one of one or more previously recorded parent response message files for creating conversation threads, wherein the client application is activated to playback the content of the one or more previously recorded response files by the at least one recipient user within the user network when said recipient user responds to one or more of the audible prompts evoked by the client application during playback of the parent response message file, and creates one or more response message insertion point metadata elements associated with the previously recorded parent response message file when said parent response message file is paused by the at least one recipient user, the response message insertion point corresponding to the portion of the parent response message file length read by the onboard microprocessor and played back before being paused by the at least one recipient user, and wherein the client application creates at least one metadata element identifying the corresponding subsequent response message file linked to the one or more response-message insertion point metadata elements.

12. The method of claim 4, further comprising:
(i) displaying on the user interfaces of the two or more digital computing devices a linear graphical representation of the primary message file length in data bytes, wherein a first terminus of the linear graphical representation corresponds to the beginning of the primary message file;
(ii) associating each of the one or more response message files linked to the primary message file with a graphical prompt representation; and
(iii) displaying on the user interfaces the one or more graphical prompts in relation to the linear graphical representation of the primary message file length such that each of the one or more graphical prompts is disposed at a specific position along the linear graphical representation of the primary message file, the specific position determined by a distance extending from the first terminus of the linear graphical representation, wherein the distance corresponds to the particular response message insertion point stored in the metadata associated with each of the one or more response message files.

13. The messaging system of claim 1, wherein the second application is operative to generate audible cues during playback of the first message indicative of the affiliation of the user or message with a particular external entity.

14. The messaging system of claim 13, wherein the external entity comprises a corporation, a sports franchise, or an educational institution.

15. The messaging system of claim 13, wherein the association of the external entity is dependent on the identity of the first user or the second user.

16. The messaging system of claim 1, wherein the first application is further operative to permit the first user to attach media to the first message such that the attached media is delivered to the second user in tandem with the first message.

17. The messaging system of claim 1, wherein the response message insertion points stored in the at least one metadata elements are time indices, each time index comprising time data representing the accumulated playback time of the primary message when said primary message was paused during playback and a response message media file was recorded by said one of the one or more users.

18. The messaging system of claim 1, wherein the response message insertion points stored in the at least one metadata elements each comprise one or more pointer metadata elements pointing to a data offset address in the primary message file, the data offset address corresponding to the number of data bytes relative to the data origin of the primary message file read by the microprocessor before pausing the playback of the message file content by the at least one recipient user.

* * * * *